Sept. 1, 1925.

P. A. DIXON

BALL COCK

Filed Oct. 6, 1924

1,551,808

Phillip A. Dixon
INVENTOR

BY Victor J. Evans
ATTORNEY

WITNESS

Patented Sept. 1, 1925.

1,551,808

UNITED STATES PATENT OFFICE.

PHILLIP A. DIXON, OF NEW BERN, NORTH CAROLINA, ASSIGNOR OF ONE-FOURTH TO C. E. IPOCK, OF CRAVEN COUNTY, NORTH CAROLINA.

BALL COCK.

Application filed October 6, 1924. Serial No. 742,046.

*To all whom it may concern:*

Be it known that I, PHILLIP A. DIXON, a citizen of the United States, residing at New Bern, in the county of Craven and State of North Carolina, have invented new and useful Improvements in Ball Cocks, of which the following is a specification.

My present invention has reference to a flush tank for toilets, etc., and is primarily directed to a ball cock therefor.

An object is the provision of a ball cock which controls the water inlet for a flush tank, the ball valve whereof being normally seated by the pressure of water thereagainst and unseated by the downward movement of the usual float and the construction being such that the valve will be maintained in seated position should the float become broken from its stem, and as a consequence prevent the overflowing of the tank.

A further object is the provision of means for controlling the water inlet to a flush tank or the like in which a ball valve is designed to be unseated by a pivotally supported float and held seated by the pressure of the inflowing water thereagainst, and in which the construction is extremely simple, readily applicable to any ordinary tank and which is automatic and positive in action.

To the attainment of the foregoing broadly stated objects and others, which will appear as the nature of the invention is better understood, reference is to be had to the drawings which accompany and which form part of this application.

In the drawings:—

Figure 1:
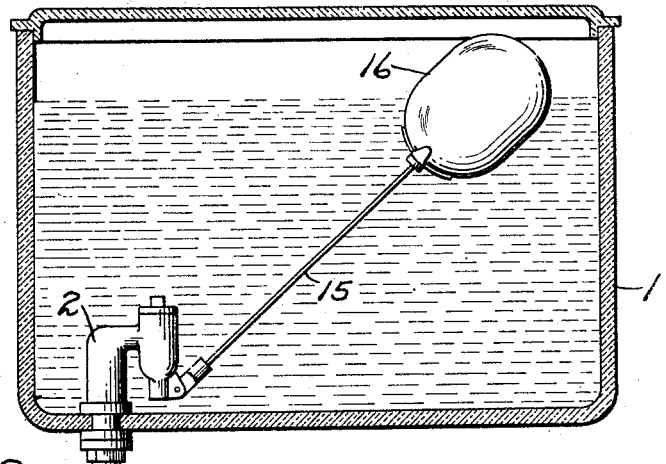
Figure 1 is a longitudinal sectional view through a flush tank provided with the improvement.

In the drawings, which are merely illustrative, the numeral 1 designates a flush tank for toilets. Water from a main is directed into the tank 1 through a ball cock in accordance with this invention.

My improvement has its body portion in the nature of a casting to include a pipe section 2 flanged as at 3 to contact with a gasket 4 on the bottom of the tank 1. The pipe below the flange 3 is formed with a threaded nipple 5 that passes through the gasket and through an opening in the bottom of the tank. There is screwed on the nipple the usual coupling 6 for the water conducting pipe, the said coupling contacting with the lower washer or gasket.

The pipe 2 has its upper end formed with a lateral and reduced branch 7 which merges into a valve chamber 8. The valve chamber is arranged in a plane with the pipe 2 and is extended in both directions from the branch 7. The lower wall of the valve chamber is cupped, as at 9, to provide an inner valve seat 10 and a reduced tubular portion 11 that extends outwardly from the seat. The tubular end 11 has its outer face slotted and formed with extensions in the nature of ears 12 between which there is pivoted, as at 13, a socket 14 in whose outer end there is screwed the stem 15 for the float 16. On its inner end the socket 14 is formed with an angle finger 17 arranged in the tubular end 11 and movable into the valve chamber, when the float is in lowered position.

Figure 2:
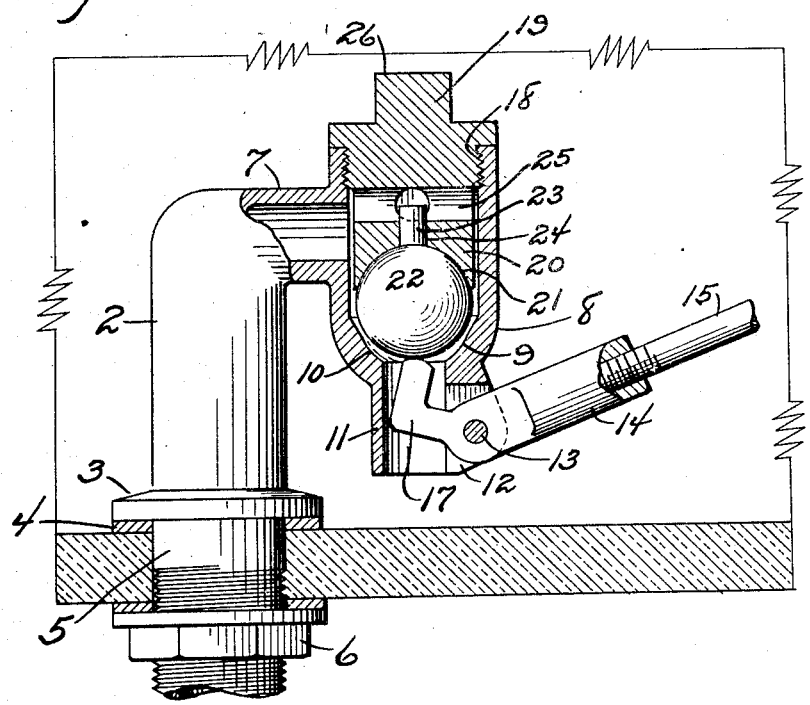
Figure 2 is an enlarged side elevation of the improvement with parts broken away and parts in section.

The cylindrical bore of the valve chamber is of a greater diameter than that of the seat 10, and the upper and open mouth of the chamber is formed with interior threads for the reception of outwardly projecting threads 18 on a plug 19. The body of the plug, indicated for distinction by the numeral 20, is of a size to be freely received in the bore of the valve chamber, and thereby spaced from contact therewith. The inner face of the plug 20 is provided with a semicylindrical depression 21 that forms a seat or pocket for a ball valve 22, when the latter is unseated, as illustrated in Figure 2 of the drawings. The ball valve has a stem 23 that passes through a vertical opening arranged centrally in the body 20 of the plug. This guide opening, indicated by the numeral 24, communicates with longitudinally arranged right-angularly disposed openings 25 in the body of the plug directly below the threaded portion thereof. The outer end of the plug is formed with a wrench hold 26.

The movement of the plug in the valve chamber is limited by the outstanding threaded portion 18 thereof so that the ball valve 22 is free to play between the seats 10 and 21. Water, from the main, entering the branches 2 and 7 of the cock will be directed against the ball valve 22 to seat the same. This water is delivered through the ports provided by the openings 25 so as to exert an even pressure against the sides of the valve as well as against the top of the valve stem so that as long as the float is in its normal raised position, the valve 22 will remain seated. As previously stated, the downward swinging of the float, when water is drawn from the tank, will bring its fingers 17 against the valve 22 to unseat the said valve. The valve 22 is preferably of rubber or some like compressible material to insure the firm seating, and consequently non-leakage of the cock.

Having described the invention, I claim:—

A flush tank and means for controlling the water inlet therefor, comprising a pipe member providing a water inlet and having a lateral branch merging into a valve chamber provided with a lower cupped valve seat, a compressible ball valve in the chamber provided with a stem, a plug screwed in the upper and open end of the chamber and limited in its movement into the chamber by such screwing, and the body of the plug being spaced from the bore of the chamber, said plug having its inner end provided with a cupped depression and an opening leading from the center thereof through which the valve stem is received, said plug having rightangular ports communicating with the said opening, and whereby water will be directed against the valve for seating the same, and float means for unseating the valve.

In testimony whereof I affix my signature.

PHILLIP A. DIXON.